Aug. 15, 1939.  A. KELLEY  2,169,607
BEATER DEVICE
Filed Oct. 27, 1937  2 Sheets-Sheet 1
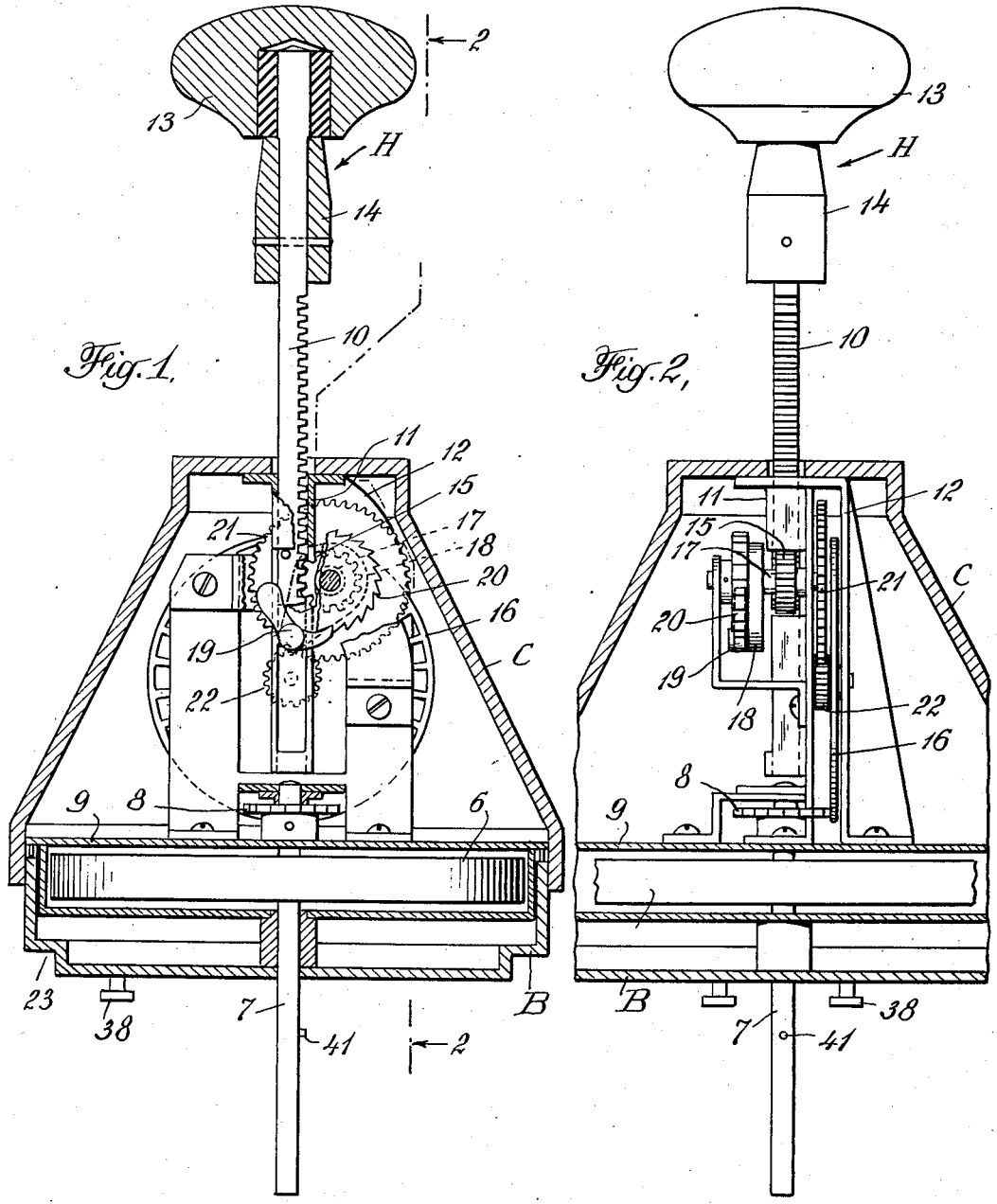
INVENTOR
Albert Kelley
BY
Pennie, Davis, Marvin & Edmonds
HIS ATTORNEYS

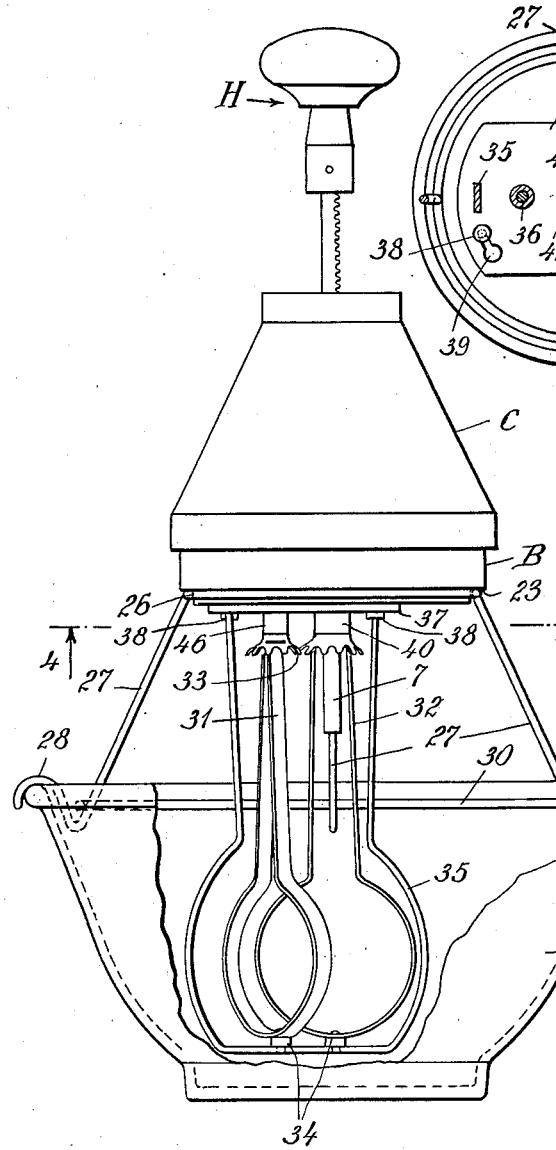
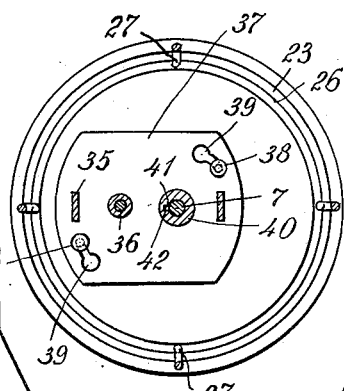
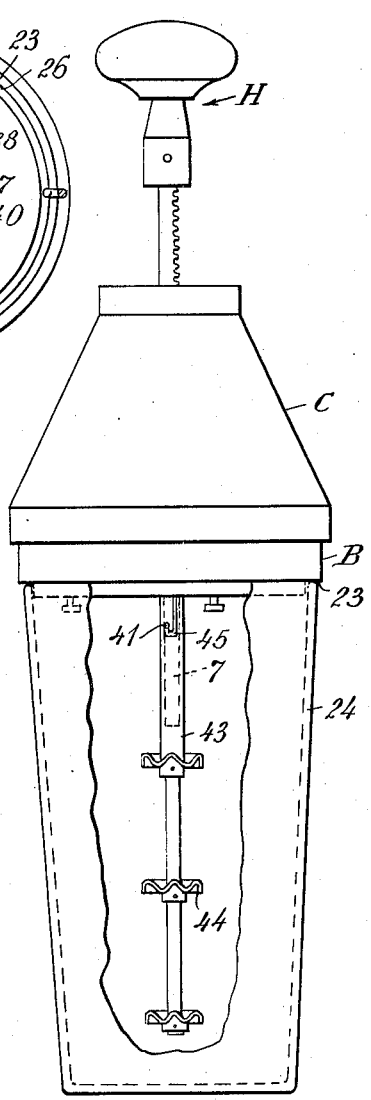
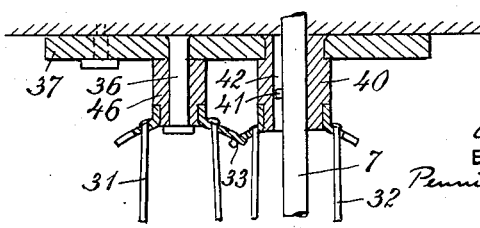

Patented Aug. 15, 1939

2,169,607

UNITED STATES PATENT OFFICE 2,169,607

BEATER DEVICE

Albert Kelley, Miami Beach, Fla.

Application October 27, 1937, Serial No. 171,251

2 Claims. (Cl. 259—104)

This invention relates to beaters or agitators and more particularly concerns an improved device for agitating, beating or mixing foods or liquid mixtures such as eggs, cream, mixed drinks, etc.

Manually operable food agitators such as egg beaters are usually designed to be supported by one hand and driven by the other. This is undesirable because the beater element is not fixed with respect to the mixing bowl or container in which it operates, and also, since both hands of the operator are occupied with the beater, ingredients cannot be conveniently added to the beaten mixture while the device is in operation.

It has been proposed to provide egg beaters which can be both supported and driven by one hand. Although this permits the addition of ingredients during operation, the manual force that can be applied to the operating member is undesirably limited because the hand must support the entire device as well as operate the handle. This fact together with the lack of a firm support for the device frequently results in movements of the beater which splash material out of the mixing bowl or tip it over.

With the above and other considerations in mind, it is proposed in accordance with the present invention to provide an improved beater device adapted for manual operation and incorporating means by which it is firmly supported on the bowl or other container for the material to be agitated, the construction being such that ample operating force can be applied to the device with one hand and without danger of inadvertently moving or tipping the container or spilling its contents. A further object of the invention is to provide a beater device having readily interchangeable beater or agitator elements whereby the device may be quickly and easily adapted to the agitation of different foods or liquids. Another object of the invention is to provide a beater device incorporating means for supporting it on the mixing bowl or container in such a manner as to permit the ready introduction of ingredients to the mixing bowl while the beater is in operation.

Other objects of the invention include the provision of a beater device which is compact, sturdy and durable and at the same time, inexpensive to manufacture and easy to assemble and operate.

In general, the above and other objects of the invention are carried out by providing a beater operating mechanism having a vertically reciprocable manually operable member or handle substantially centrally disposed with respect to the support or housing of the driving gear and providing means for mounting such mechanism centrally on a mixing bowl or equivalent container. With this arrangement, the operating handle can be forceably depressed by one hand without movement of the beater relative to the container and without danger of moving or tipping the container or otherwise spilling its contents. Other specific objects of the invention are carried out by the elements and combinations which are described more in detail below.

The invention will be best understood by reference to the accompanying drawings, in which a typical embodiment thereof has been illustrated. In the drawings;

Figure 1 is a sectional elevation of the beater driving mechanism with the agitator element removed;

Figure 2 is a sectional elevation of the beater driving mechanism, taken along the line 2—2 of Figure 1 and viewed in the direction of the arrows;

Figure 3 is an elevation of the improved beater device mounted on a mixing bowl with an egg beater type of agitator element in place;

Figure 4 is a view of the bottom of the driving mechanism, taken along the line 4—4 of Figure 3 and viewed in the direction of the arrows;

Figure 5 is a sectional elevation of the driving connections of the agitator element of Figures 3 and 4; and Figure 6 is an elevation of the beater device mounted on a modified form of mixing container and equipped with a movable drink mixing element.

Referring to the drawings and particularly Figures 1 and 2, the driving mechanism of the disclosed embodiment comprises generally a base member B enclosing a vertical axis flywheel 6, a cover member or housing C enclosing the driving gear and a vertically reciprocable upwardly extending operating handle H disposed centrally with respect to the base B and cover C.

The vertical agitator element drive shaft 7 of the device is journaled in the base member B and the flywheel 6 is fixed to the shaft. The shaft 7 is preferably centrally disposed in base B. A star wheel 8 is fixed to the shaft 7 within the driving gear housing formed by the cover C and just above the upper plate 9 of the base B. The cover C may be removably secured to the base B by frictional engagement or otherwise.

Any suitable driving gear may be employed to transmit operating power from the handle H to the agitator drive shaft 7. In the disclosed embodiment, the handle H comprises a rack bar 10 carried in a central guide 11 mounted on the base plate 9 by a bracket frame 12. A knob 13 is attached to the upper end of the rack bar 10 and a collar 14 is fixed to the bar below the knob and limits the downward movement of the bar. The rack teeth of the bar 10 engage a pinion 15 which drives a sprocket wheel 16 through an overrunning pawl and ratchet mechanism and a gear train, the shafts of the various rotating elements being carried in the bracket frame 12 and the extensions thereof as clearly shown in Figures 1 and 2. The sprocket 16 engages the star wheel 8 on the agitator drive shaft 7, and in this manner, driving power is transmitted from the handle H to the shaft 7 when the handle is depressed.

Various forms of overrunning clutch mechanism may be used in the driving gear. In the disclosed embodiment, the rack driven pinion 15 is connected by a hollow shaft 17 to an arm 18 on which a pawl 19 is pivotally supported. The pawl 19 engages the teeth of a ratchet wheel 20 connected to the gear wheel 21 through a shaft journaled within the hollow shaft 17. The gear wheel 21 engages a pinion 22 on the shaft of the sprocket wheel 16.

With the arrangement described, downward movement of the operating handle H rotates the pinion 15 in such a direction that the pawl 19 engages the teeth of the ratchet wheel 20 and so transmits driving power to the agitator drive shaft 7. When the operating handle H stops or is moved upwardly, the pawl 19 rides over the ratchet teeth of the wheel 20 while the shaft 7 continues to rotate by reason of the momentum of the flywheel 6.

As explained above, the improved beater device is preferably supported by the mixing bowl or other container for the material to be agitated. To this end, the base B is preferably circular and is provided with a circular recess 23 designed to make a firm engagement with the upper edge of a jar or container 24, as shown in Figure 6. When a mixing bowl 25 of the type shown in Figure 3 is employed, a bracket structure is provided for supporting the beater device centrally upon the bowl. As shown in Figure 3, the bracket device preferably comprises an upper ring 26 engaged in the recess 23 of the base B and supported by downwardly extending divergent legs 27 terminating in hooks 28 which firmly engage the bowl rim 29. A bracing ring 30 preferably connects the legs 27 adjacent their lower ends. With the described arrangement, ingredients may be poured into the bowl 25 between the bracket legs 27 while the beater is in operation.

Various forms of agitator elements may be removably secured to the operating mechanism, and these elements may be supported either on the drive shaft 7 or from the base B. As shown in Figure 3, a double beater agitator of the type customarily used for beating eggs or similar material is preferably supported from the base B. The mechanism shown comprises two beater elements 31 and 32 operatively connected by the star gears 33 and rotatably carried by studs 34 on the frame 35. As shown in Figure 5, the upper end of the beater 31 comprises a collar 46 journaled on a stud 36 fixed to a plate 37. The other beater 32 has a collar 40 journaled in an opening in the plate 37, and a keyway or slot 42 is provided in the collar 40. The frame 35 is fixed at its ends to the plate 37 and the plate is removably secured to the lower surface of the base B by the engagement of flat headed rivets 38 on the base with "keyhole" openings 39 in the plate 37. When the beater is secured to the operating mechanism, the drive shaft 7 is passed through the driving collar 40 of the beater 32. A pin 41 on the shaft 7 engages the slot 42 in the driving collar 40 thereby providing a readily separable driving connection between the shaft and the beaters.

Various agitator means other than the egg beater type of agitator may be connected to the driving mechanism. As shown in Figure 6, a mixing agitator comprising a single shaft 43 carrying agitating discs 44 may be removably connected to the drive shaft 7. As shown in the drawings, the hollow upper end of the shaft 43 slips over the drive shaft 7 and the pin 41 engages a bayonet slot 45 in the shaft 43, whereby a readily detachable driving and supporting connection is provided.

In operation, the operating handle H is alternately pressed down and lifted whereby the agitator member is rotated through the driving gear. During the upward idle movement of the handle H, the momentum of the flywheel 6 drives the agitator member. Spring means may be provided for returning the operating handle to its upper position, if desired.

The compact and convenient nature of the improved beater device will be readily apparent. The driving gear is completely enclosed and thus protected from liquids or dirt which might clog or otherwise impair the action thereof. The agitator means may be readily removed and replaced and the separable driving and supporting connections for the agitators are of simple and dependable design. Since the operating handle is centrally located with respect to its supporting structure and the mixing container, a considerable downward force can be applied to the operating handle with one hand and without danger of moving or tipping the container.

I claim:

1. In a beater device of the character described, a base member having a substantially horizontal lower surface, a substantially vertical agitator element drive shaft extending downwardly from said base member, means for rotating said shaft and a detachable agitator element comprising a plate having an opening therein for the reception of said shaft, a beater element rotatably secured to said plate, separable means operated by turning said plate about said shaft for locking said plate to said base member and means on said shaft forming a driving connection with said beater element when the said plate is locked to said base member.

2. In a beater device of the character described, a base member having a substantially horizontal lower surface, a substantially vertical agitator element drive shaft extending downwardly from said base member, means for rotating said shaft and a detachable agitator element comprising a plate having an opening therein, a collar journaled in said opening and having an opening for the reception of said shaft, a beater element fixed to said collar, separable means on said base member and said plate for locking said plate to said base member upon the turning of said plate about said shaft, and a separable driving connection between said shaft and said collar.

ALBERT KELLEY.